United States Patent
Ghiasi et al.

(10) Patent No.: US 9,130,851 B2
(45) Date of Patent: *Sep. 8, 2015

(54) SYSTEM AND METHOD FOR INCREASING INPUT/OUTPUT SPEEDS IN A NETWORK SWITCH

(71) Applicant: Broadcom Corporation, Irvine, CA (US)

(72) Inventors: Ali Ghiasi, Cupertino, CA (US); Velu Pillai, Austin, TX (US); Sundar Chidambara, Austin, TX (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/075,113

(22) Filed: Nov. 8, 2013

(65) Prior Publication Data
US 2014/0064088 A1    Mar. 6, 2014

Related U.S. Application Data

(63) Continuation of application No. 13/165,400, filed on Jun. 21, 2011, now Pat. No. 8,582,437.

(51) Int. Cl.
*H04L 12/801* (2013.01)
*H04L 7/04* (2006.01)
*H04L 12/931* (2013.01)

(52) U.S. Cl.
CPC .............. *H04L 47/10* (2013.01); *H04L 7/041* (2013.01); *H04L 49/60* (2013.01)

(58) Field of Classification Search
None
See application file for complete search history.

(56) References Cited

U.S. PATENT DOCUMENTS

| | | | |
|---|---|---|---|
| 5,502,499 A | 3/1996 | Birch et al. | |
| 5,550,815 A | 8/1996 | Cloonan et al. | |
| 5,838,684 A | 11/1998 | Wicki et al. | |
| 6,249,525 B1 | 6/2001 | Aggarwal et al. | |
| 6,690,682 B1* | 2/2004 | Giaretta et al. | 370/535 |
| 6,788,682 B1* | 9/2004 | Kimmitt | 370/389 |
| 6,888,848 B2 | 5/2005 | Beshai et al. | |
| 6,907,002 B2 | 6/2005 | Beshai et al. | |
| 6,990,097 B2 | 1/2006 | Norman et al. | |
| 7,245,633 B1 | 7/2007 | Mueller | |
| 7,257,616 B2 | 8/2007 | Bass et al. | |
| 7,369,491 B1 | 5/2008 | Beshai et al. | |
| 7,460,563 B1 | 12/2008 | Boluna | |
| 7,519,055 B1* | 4/2009 | Zheng et al. | 370/389 |
| 7,620,048 B2 | 11/2009 | Bass et al. | |
| 7,715,377 B2 | 5/2010 | Mick et al. | |
| 7,839,839 B2 | 11/2010 | Brown et al. | |
| 7,843,830 B1 | 11/2010 | Subramanian et al. | |
| 7,961,649 B2 | 6/2011 | Beshai | |
| 8,205,141 B2 | 6/2012 | Caggioni et al. | |
| 2003/0043798 A1 | 3/2003 | Pugel | |
| 2004/0030805 A1 | 2/2004 | Fujimori et al. | |

(Continued)

*Primary Examiner* — Ian N Moore
*Assistant Examiner* — Phong La
(74) *Attorney, Agent, or Firm* — Foley & Lardner LLP; Christopher J. McKenna; Angela D. Murch

(57) ABSTRACT

A system and method for increasing input/output speeds in a network switch. A physical layer device is provided that includes a physical coding sublayer that insert data flow identifiers to data flows that are provided to a gearbox. In one embodiment, the gearbox is a 5 to 2 gearbox that can transport various combinations of 10G/40G data flows over a narrower interface to a second physical layer device having an inverse gearbox.

18 Claims, 4 Drawing Sheets

(56) References Cited

U.S. PATENT DOCUMENTS

| | | |
|---|---|---|
| 2004/0052530 A1 | 3/2004 | Tian et al. |
| 2004/0078621 A1 | 4/2004 | Talaugon et al. |
| 2004/0090995 A1 | 5/2004 | Kang et al. |
| 2004/0151195 A1 | 8/2004 | Donoghue et al. |
| 2005/0232204 A1 | 10/2005 | Bass et al. |
| 2006/0133411 A1 | 6/2006 | Denton et al. |
| 2006/0143355 A1 | 6/2006 | Taborek et al. |
| 2007/0109968 A1 | 5/2007 | Hussain et al. |
| 2009/0168812 A1 | 7/2009 | Crookes et al. |
| 2009/0232133 A1* | 9/2009 | Yu et al. .................. 370/389 |
| 2009/0252166 A1* | 10/2009 | Handelman .................. 370/391 |
| 2010/0092174 A1 | 4/2010 | Brown et al. |
| 2010/0232786 A1* | 9/2010 | Aoki et al. .................. 398/19 |
| 2010/0281343 A1* | 11/2010 | Caggioni et al. .............. 714/776 |
| 2012/0155486 A1* | 6/2012 | Ahn et al. .................. 370/433 |
| 2012/0219005 A1* | 8/2012 | Durve et al. .................. 370/400 |
| 2012/0236869 A1 | 9/2012 | Julien et al. |

\* cited by examiner

| 10 | Control Block | | 11 | Control Block | | 00 | Control Block | | 10 | Control Block |

*FIG. 2*

| 0 1 | 2      9 | 10     17 | 18     25 | 26     33 | 34     41 | 42     49 | 50     57 | 58     65 |
|---|---|---|---|---|---|---|---|---|
| 10 | $M_0$ | $M_1$ | $M_2$ | $BIP_3$ | $M_4$ | $M_5$ | $M_6$ | $BIP_7$ |

*FIG. 3*

SYSTEM AND METHOD FOR INCREASING INPUT/OUTPUT SPEEDS IN A NETWORK SWITCH

This application is a continuation of non-provisional application Ser. No. 13/165,400, filed Jun. 21, 2011, which is incorporated by reference herein, in its entirety, for all purposes.

BACKGROUND

1. Field of the Invention

The present invention relates generally to network switches and, more particularly, to a system and method for increasing input/output speeds in a network switch.

2. Introduction

Increasing demands are being placed upon the data communications infrastructure. These increasing demands are driven by various factors, including the increasing bandwidth requirements of multimedia traffic. To accommodate the increasing bandwidth requirements, communication link speeds have also continued to evolve. Today, 10 Gigabit Ethernet (GbE) ports are commonly used. Many of today's network switches, for example, support 10 gigabit I/O port speeds.

Even with 10 GbE ports, increased switch bandwidth is needed. Increasing switch I/O port speeds is a consideration, but such an increase can lead to inefficiencies due to the existence of legacy links. What is needed therefore is a mechanism that increases I/O speeds in a network switch, yet enables support for legacy speeds in an efficient manner.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2 illustrates an example embodiment of data flow marking through modification of a synchronization header.

FIG. 3 illustrates an example embodiment of data flow marking using multi-lane distribution PCS lane identifiers.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Due to bandwidth demand, a network switch can support over 100 ports, each of which can be operating at 10.3125 gbps. Increasing switch bandwidth can be effected through an increase in the I/O speeds. For example, in one embodiment the switch bandwidth can be increased by increasing the I/O speed to 25.7 gbps. With this I/O speed increase, only four lanes would be required to transport 100 GbE traffic. This is in contrast to a conventional use of ten lanes to transport 100 GbE traffic.

Significantly, increasing the I/O speed on the switch narrows the switch interface (i.e., from ten lanes to four lanes), which makes the interface module narrower. While the narrowing of the switch interface has obvious benefits in increasing switch bandwidth, support of legacy speeds such as 10 GbE or 40 GbE would not be possible, at least efficiently. Typically, support of legacy speeds is to operate the port at a lower speed. This method of operation is inefficient as it wastes significant amounts of bandwidth. For example, transporting 10 GbE over an I/O port that has 2.5 times the currently-used capacity is an inefficient use of available I/O port bandwidth.

Figure 1:
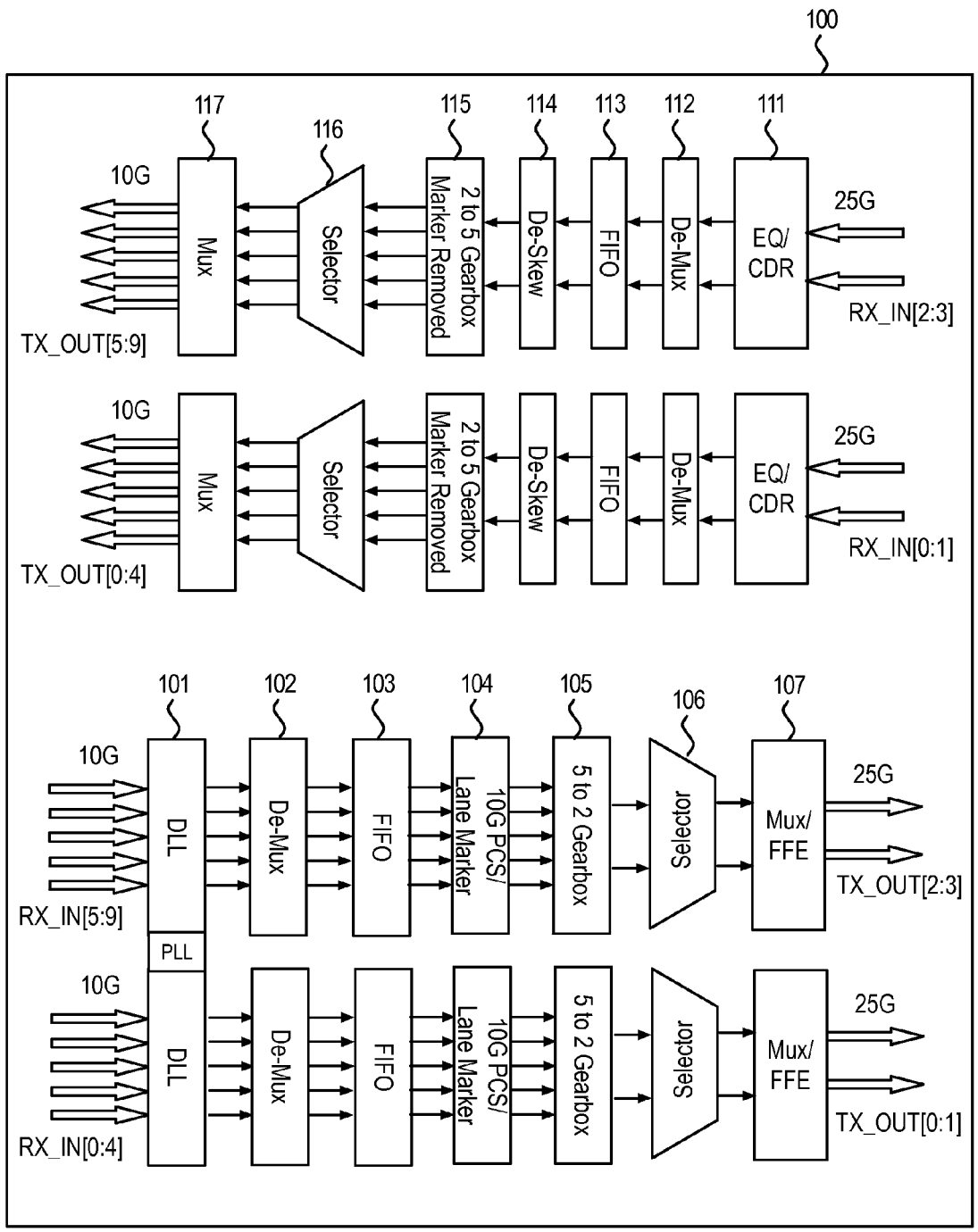
FIG. 1 illustrates an embodiment of a physical layer device according to the present invention.

In the present invention, it is recognized that a mechanism is needed to use full I/O port bandwidth when transporting all traffic types. One embodiment of such a mechanism is that illustrated by the example physical layer device of FIG. 1. As illustrated, physical layer device of the present invention can be embodied as a 100 GbE physical layer device that supports a transport of various combinations of 10 GbE and 40 GbE data flows through I/O speeds of 25.7 gbps. As will be described, the transport of various combinations of 10 GbE and 40 GbE data flows is performed efficiently without a conventional waste of I/O bandwidth.

As illustrated, the example embodiment of 100 GbE physical layer device 100 includes two data flow paths for each direction of traffic, wherein each data flow path supports a transport of half of the data flows in a single direction. As would be appreciated, in another embodiment, all of the data flows in a single direction can be handled by a single data flow path.

Consider first the two data flow paths going from left to right in the bottom half of physical layer device 100. Each data flow path is designed to receive as input five 10.3125 gbps data flows. The lower data flow path receives the five 10G data flows denoted as RX_IN[0:4], while the upper data flow path receives the five 10G data flows denoted as RX_IN [5:9]. In general, it is desired that physical layer device 100 facilitate an increase of I/O speed from 10.3125 gbps to 25.7 gbps, thereby narrowing the I/O interface.

To illustrate such an operation, a description of the upper data flow path in the left-to-right direction of physical layer device 100 is now provided. In general, the increase in I/O speed is facilitated by 5 to 2 Gearbox 105, which works on data flows that are marked by 10G PCS/Lane Marker module 104. As illustrated, 10G PCS/Lane Marker module 104 operates on five 10G data flows RX_IN[5:9] that have passed through delay locked loop (DLL) module 101, de-multiplexer (De-Mux) module 102 and first-in-first-out (FIFO) module 103. Here, it should be noted that in one embodiment, a single 10 to 4 gearbox can be used to facilitate a single data flow path.

In the present invention, 5 to 2 gearbox 105 does not use simple bit multiplexing to adapt a set of input lanes to a set of output lanes at a 5:2 ratio. Rather, 5 to 2 Gearbox 105 is designed to operate on data flows that have been marked with a data flow identifier by 10G PCS/Lane Marker module 104. In general, the addition of data flow identifiers by 10G PCS/Lane Marker module 104 enables an inverse 2 to 5 gearbox to decode, align, and identify each data flow. Inverse 2 to 5 gearbox can then present each data flow to a specific location based on the data flow identifier.

In physical layer device 100, the 10G traffic on RX_IN[5:9] are stripped at the 66-bit boundary for transport onto 25G data flows TX_Out[2:3], while the 10G traffic on RX_IN[0:4] are stripped at the 66-bit boundary for transport onto 25G data flows TX_Out[0:1]. The 66-bit boundaries are defined by the 66-bit frames resulting from the 64B/66B PCS coding process. These 66-bit frames include 64 bits of data along with a 2-bit synchronization (sync) header. The 66-bit blocks are either data frames or control frames. The sync header is '01' for data frames and '10' for control frames. The remaining 64 bits of the 66-bit frame contain the scrambled payload.

In one embodiment, the sync header on data flows 0 and 5 are modified every 1000 66-bit blocks from '10' to '11', a previously unused sync header bit combination. The next immediate control frame sync header is then changed to from '10' to '00', which is also a previously unused sync header bit combination. This example marking of the sync headers in data flows 0 and 5 with previously unused sync header bit combinations is illustrated in FIG. 2. It should be noted that in one embodiment, no modification is made to the sync header of a data frame in order not to potentially increase undetected error probability.

As would be appreciated, the time between modification of control frame sync headers can be implementation dependent. Moreover, the particular data flow or data flows that are chosen for marking can also be implementation dependent. Here, it is significant that the marking of one or more data flows enables an inverse gearbox to decode, align, and identify each data flow.

In an alternative embodiment, the payload within a control frame can be modified for data flow marking. For example, a fiber channel control frame payload can be unscrambled and its contents replaced with an unused signal order set that identifies the data flow. As would be appreciated, the particular unused signal order set used that identifies the data flow would be implementation dependent. At the receiving end, the unused signal ordered set would be replaced with the data that previously existed in the payload of the control frame.

In yet another embodiment, data flow marking is facilitated by occasionally replacing standard Ethernet Idle frames with Multi-Lane Distribution (MLD) PCS lane identifiers used as physical data flow identifiers. MLD PCS lane identifiers are defined in IEEE 802.3 Clause 82. Table 1 below identifies the data flow identifier components that are arranged in the format illustrated in FIG. 3. Here, Bit Interleaved Parity (BIP) field $BIP_7$ is a bit-wise inversion of $BIP_3$.

TABLE 1

| Data Flow Number | Encoding $(M_0, M_1, M_2, BIP_3, M_4, M_5, M_6, BIP_7)$ |
| --- | --- |
| 0 | 0xC1, 0x68, 0x21, $BIP_3$, 0x3E, 0x97, 0xDE, $BIP_7$ |
| 1 | 0x9D, 0x71, 0x8E, $BIP_3$, 0x62, 0x8E, 0x71, $BIP_7$ |
| 2 | 0x59, 0x4B, 0xE8, $BIP_3$, 0xA6, 0xB4, 0x17, $BIP_7$ |
| 3 | 0x4D, 0x95, 0x7B, $BIP_3$, 0xB2, 0x6A, 0x84, $BIP_7$ |
| 4 | 0xF5, 0x07, 0x09, $BIP_3$, 0x0A, 0xF8, 0xF6, $BIP_7$ |
| 5 | 0xDD, 0x14, 0xC2, $BIP_3$, 0x22, 0xEB, 0x3D, $BIP_7$ |
| 6 | 0x9A, 0x4A, 0x26, $BIP_3$, 0x65, 0xB5, 0xD9, $BIP_7$ |
| 7 | 0x7B, 0x45, 0x66, $BIP_3$, 0x84, 0xBA, 0x99, $BIP_7$ |
| 8 | 0xA0, 0x24, 0x76, $BIP_3$, 0x5F, 0xDB, 0x89, $BIP_7$ |
| 9 | 0x68, 0xC9, 0xFB, $BIP_3$, 0x97, 0x36, 0x04, $BIP_7$ |

Where the gearbox has 10 input data flows, only the first ten MLD PCS lane identifiers need be used as physical data flow identifiers. In one embodiment, additional MLD PCS lane identifiers can be used to accommodate gearboxes that have greater than ten input data flows.

Using the MLD PCS lane identifiers as physical data flow identifiers, the 10G traffic on RX_IN[5:9] are stripped at the 66-bit boundary for transport onto 25G data flows TX_Out[2:3], while the 10G traffic on RX_IN[0:4] are stripped at the 66-bit boundary for transport onto 25G data flows TX_Out[0:1]. Occasionally, the 66-bit stripped Ethernet idle frame is replaced with the physical data flow identifiers defined above in Table 1 to identify the physical data flows. As would be appreciated, the frequency at which the Ethernet IPG idle data is replaced with physical data flow identifiers would be implementation dependent.

At the receiving end, the 66-bit data would be decoded by the inverse gearbox to identify each data flow per the included physical data flow identifiers. The inverse gearbox would then replace the physical data flow identifier with the Ethernet idle frame before presentation of the data at a specific output port.

Here, it should be noted that the addition of physical data flow identifiers enables the physical layer device to source traffic on a fractional pipe where a portion of the capacity of the higher-rate output data flows is left unused. For example, 40 GbE traffic can be input on RX_IN[5:9] and output as 2×20G traffic on TX_OUT[2:3].

As has been described, various mechanisms can be used by 10G PCS/Lane Marker module 104 in physical layer device 100 to mark the data flows that are received at the input (e.g., RX_IN[5:9]). Returning to FIG. 1, the marked data flows are then passed to 5 to 2 Gearbox 105. 5 to 2 Gearbox 105 receives the 66-bit data flow frames from the five 10G input data flows marked by 10G PCS/Lane Marker module 104 and generates two higher-rate 25G data flows in accordance with a frame distribution scheme defined by the 5:2 ratio. As would be appreciated, a 5 to 2 gearbox can also be defined that can generate four 25G data flows from ten 10G data flows.

More generally, it should be noted that the principles of the present invention are not confined to the example 5:2 ratio. Other ratios can be used to accommodate specific combinations of input data flows.

5 to 2 Gearbox 105 passes the two higher rate 25G data flows to Selector module 106. Although not shown, Selector module 106 also receives loopback and pattern generation inputs. Selector module 106 passes one of the selected inputs to Multiplexer (Mux)/Feed Forward Equalizer (FFE) module 107. Mux/FFE module 107 then outputs the two higher rate 25G data flows as TX_OUT[2:3].

The two higher rate 25G output data flows represent a higher rate I/O interface that facilitates a narrower interface module. The counterpart to the transmit direction in the lower half of physical layer device 100 is the receive direction in the upper half of physical layer device 100.

As illustrated, the upper data flow path in the right-to-left direction of physical layer device 100 receives two higher rate 25G data flows as inputs RX_IN[2:3] by Equalization (EQ)/Clock and Data Recovery (CDR) module 111. The signals received by EQ/CDR module 111 then pass through De-Mux module 112, FIFO module 113, and De-Skew module 114 before being presented to the inverse 2 to 5 Gearbox 115. In one embodiment, a single inverse 4 to 10 gearbox can be used to facilitate a single data flow path.

In addition to generating five 10G data flows based on the two 25G data flows in accordance with the defined 2:5 ratio, 2 to 5 Gearbox 115 is also operative to remove the data flow markers that were inserted by 10G PCS/Lane Marker module 104. Here, removal of the data flow markers can include the process of reestablishing the 66-bit control frames in their original form. As such, contents of the sync header or the payload can be reestablished in their original form as would be apparent.

2 to 5 Gearbox 115 passes the five lower rate 10G data flows to Selector module 116. Although not shown, Selector module 116 also receives loopback and pattern generation inputs. Selector module 116 passes one of the selected inputs to Mux module 117. Mux module 107 then outputs the five lower rate 10G data flows as TX_OUT[5:9].

Having described a physical layer device that incorporates a 5 to 2 gearbox and an inverse 2 to 5 gearbox, example applications are provided in the efficient transport of various combinations of 10 GbE and 40 GbE data flows.

Figure 4:
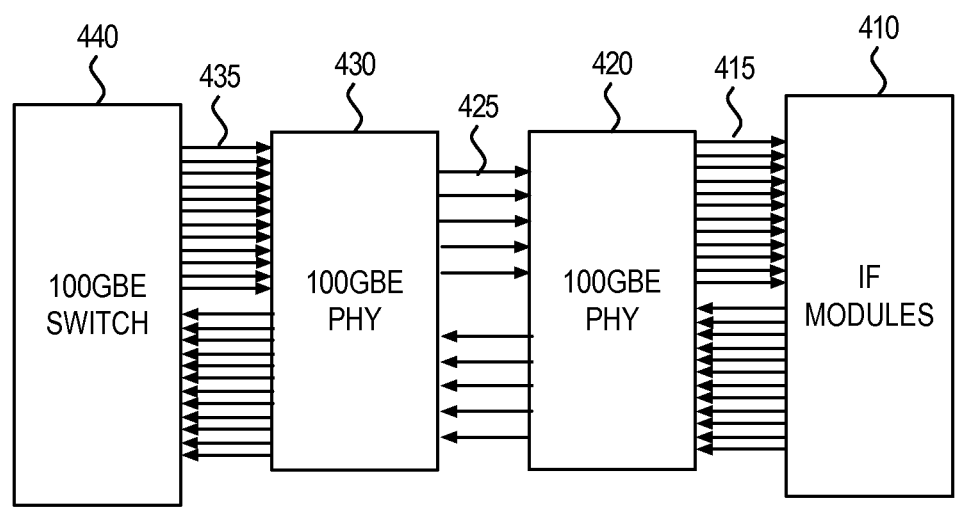
FIG. 4 illustrates a first embodiment of an application of a 100 GbE PHY according to the present invention.

FIG. 4 illustrates one embodiment of an example application in providing an interface to a device such as a switch, packet processor, ASIC, etc. In this illustrated embodiment, 100 GbE PHYs 420, 430 provide a transport mechanism between IF modules 410 and 100 GbE switch 440. As described above, PHYs 420, 430 support a narrower interface 425 between each other using four 25G data flows that are supported by a 5 to 2 gearbox and an inverse 2 to 5 gearbox.

One application of such an arrangement is transport to a remote expansion box to support a large number of ports that could not otherwise be supported within a single box. For example, such a transport application could be applied to the support of an expansion server blade.

In one example application, 100 GbE PHY 430 supports a single 100 Gigabit Attachment Unit Interface (CAUI) 435 with switch 440. In this arrangement, IF modules 410 can include various combinations of 10G and 40G interfaces. For example, IF modules 410 can include support for 10 GbE such as 10GBASE-SR, 10GBASE-LR, SFP+ Direct Attach Copper, etc., and 40 GbE such as 40GBASE-SR4, 40GBASE-LR4, etc.

In one arrangement, IF modules 410 can support ten 10 GbE data flows for delivery over interface 415. In another arrangement, IF modules 410 can support one 40 GbE data flow and six 10 GbE data flows. In yet another arrangement, IF modules 410 can support two 40 GbE data flows and two 10 GbE data flows. Regardless of the combination of 10/40 GbE data flows that are provided by IF modules 410 for delivery over interface 415, 100 GbE PHYs 420, 430 can deliver the 10/40 GbE combination of data flows to switch 440 over CAUI interface 435. This application illustrates the ability of 100 GbE PHYs 420, 430 to accommodate legacy traffic in an I/O interface of a switch in an efficient manner.

In another arrangement, interface 435 is based on a 40 Gigabit Attachment Unit Interface (XLAUI). This arrangement illustrates a usage scenario where PHYs 420, 430 support transport of traffic in a fractional pipe. Assume for example that IF modules 410 support two 40G data flows. These two 40G data flows can be carried over interface 425 using four 20G data flows that are generated by a 5 to 2 gearbox. Each of these 20G data flows represent a fraction of the true 25G data flow capacity. After transport between PHYs 420, 430, the four 20G data flows are provided to switch 440 using two XLAUI interfaces 435.

In another fractional-pipe scenario, IF modules 410 can support a single 40G data flow, wherein the 40G data flow can be carried over interface 425 using four 10G data flows that are generated by a 5 to 2 gearbox. After transport between PHYs 420, 430, the four 10G data flows are provided to switch 440 using a single XLAUI interfaces at interface 435.

Figure 5:
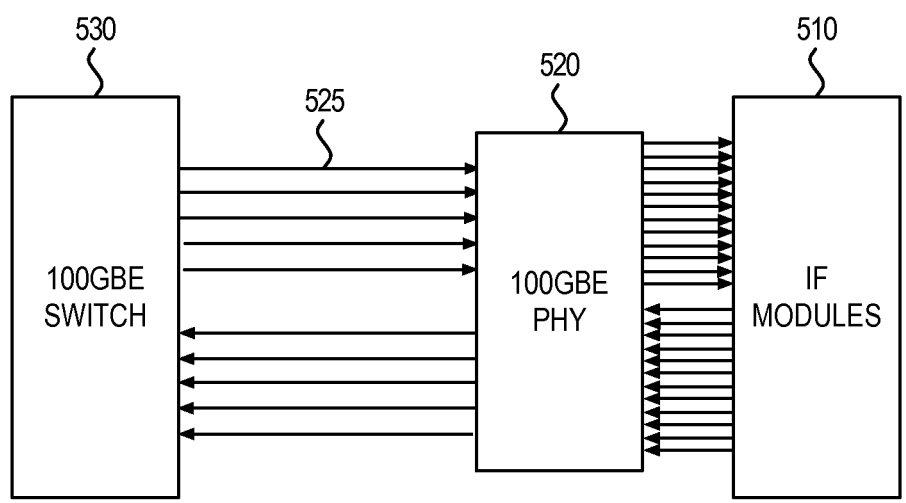
FIG. 5 illustrates a second embodiment of an application of a 100 GbE PHY according to the present invention.

FIG. 5 illustrates a second embodiment of an example application in providing an interface to a device such as a switch, packet processor, ASIC, etc. In this illustrated embodiment, 100 GbE switch 530 incorporates the physical layer device components of FIG. 1 in supporting a 25G I/O interface. Here, 100 GbE PHY 520 supports an I/O interface 525 that can support various combinations of legacy 10G/40G traffic such as that outlined above in an efficient manner.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A 100 Gigabit Ethernet physical layer device, comprising:
a 100 Gigabit interface configured to receive four 25 Gigabit data flows;
a gearbox having a two to five ratio that enables a production of two 10 Gigabit data flows and two 40 Gigabit data flows for every four 25 Gigabit data flows received, the gearbox being configured to remove data flow markers inserted in data flows contained within the four 25 Gigabit data flows, the data flow markers inserted as control frames into the data flows periodically at every X 66-bit blocks, the control frames distinguishable from data frames based on a different synchronization header in the control frames as compared to the data frames; and
a plurality of output interfaces, the plurality of output interfaces including a first output interface for a first 10 Gigabit data flow, a second output interface for a second 10 Gigabit data flow, a third output interface for a first 40 Gigabit data flow, and a fourth output interface for a second 40 Gigabit data flow, the first and second 10 Gigabit data flows and the first and second 40 Gigabit data flows received by the 100 Gigabit Ethernet physical layer device within the four 25 gigabit data flows.

2. The 100 Gigabit Ethernet physical layer device of claim 1, wherein the four 25 Gigabit data flows are received from a 100 Gigabit switch device.

3. The 100 Gigabit Ethernet physical layer device of claim 1, wherein the four 25 Gigabit data flows are received from a 100 Gigabit packet processor device.

4. The 100 Gigabit Ethernet physical layer device of claim 1, wherein the four 25 Gigabit data flows are received from a 100 Gigabit ASIC device.

5. The 100 Gigabit Ethernet physical layer device of claim 1, wherein the data flow markers are based on a modification to a synchronization header.

6. The 100 Gigabit Ethernet physical layer device of claim 1, wherein the data flow markers are based on a modification of a payload of a control frame to include an unused signal order set.

7. The 100 Gigabit Ethernet physical layer device of claim 1, wherein the data flow markers replace idle frames.

8. A 100 Gigabit Ethernet physical layer device, comprising:
a 100 gigabit interface configured for transmitting four 25 Gigabit data flows;
a physical coding sublayer module configured to receive a plurality of input data flows generated by a plurality of interface modules, the plurality of interface modules including a first 10 Gigabit interface module, a second 10 Gigabit interface module, a first 40 Gigabit interface module, and a second 40 Gigabit interface module, the physical coding sublayer module configured to insert data flow markers into each of the plurality of input data flows to produce a corresponding plurality of marked input data flows, the data flow markers inserted as control frames into the plurality of input data flows periodically at every X 66-bit blocks, the control frames distinguishable from data frames based on a different synchronization header in the control frames as compared to the data frames; and a gearbox having a five to two ratio that enables a production of four 25 Gigabit data flows based on the plurality of marked input data flows produced by the physical coding sublayer module, wherein the four 25 Gigabit data flows produced by the gearbox are output to the 100 Gigabit interface.

9. The 100 Gigabit Ethernet physical layer device of claim 8, wherein the four 25 Gigabit data flows are output to a 100 Gigabit switch device.

10. The 100 Gigabit Ethernet physical layer device of claim 8, wherein the four 25 Gigabit data flows are output to a 100 Gigabit packet processor device.

11. The 100 Gigabit Ethernet physical layer device of claim 8, wherein the four 25 Gigabit data flows are output to a 100 Gigabit ASIC device.

12. The 100 Gigabit Ethernet physical layer device of claim 8, wherein the data flow markers are based on a modification to a synchronization header.

13. The 100 Gigabit Ethernet physical layer device of claim 8, wherein the data flow markers are based on a modification of a payload of a control frame to include an unused signal order set.

14. The 100 Gigabit Ethernet physical layer device of claim 8, wherein the data flow markers replace idle frames.

15. A method performed by a 100 Gigabit Ethernet physical layer device, the 100 Gigabit Ethernet physical layer device having a gearbox with a five to two ratio, comprising:

receiving, by a physical coding sublayer module in the 100 Gigabit Ethernet physical layer device, a plurality of input data flows generated by a plurality of interface modules, the plurality of interface modules including a first 10 Gigabit interface module, a second 10 Gigabit interface module, a first 40 Gigabit interface module, and a second 40 Gigabit interface module;

inserting, by the physical coding sublayer module, data flow markers into the plurality of input data flows to produce a corresponding plurality of marked input data flows, the data flow markers inserted as control frames into the plurality of input data flows periodically at every X 66-bit blocks, the control frames distinguishable from data frames based on a different synchronization header in the control frames as compared to the data frames;

producing, by the gearbox having a five to two ratio, four 25 Gigabit data flows based on the plurality of marked input data flows; and transmitting the four 25 Gigabit data flows produced by the gearbox as an output on a 100 Gigabit interface of the 100 Gigabit Ethernet physical layer device.

16. The method of claim 15, wherein the data flow markers are based on a modification to a synchronization header.

17. The method of claim 15, wherein the data flow markers are based on a modification of a payload of a control frame to include an unused signal order set.

18. The method of claim 15, wherein the data flow markers replace idle frames.

* * * * *